March 15, 1949. A. R. CUNNINGHAM 2,464,635
VARIABLE SPEED POWER TRANSMITTING MECHANISM
Filed April 7, 1947 5 Sheets-Sheet 3
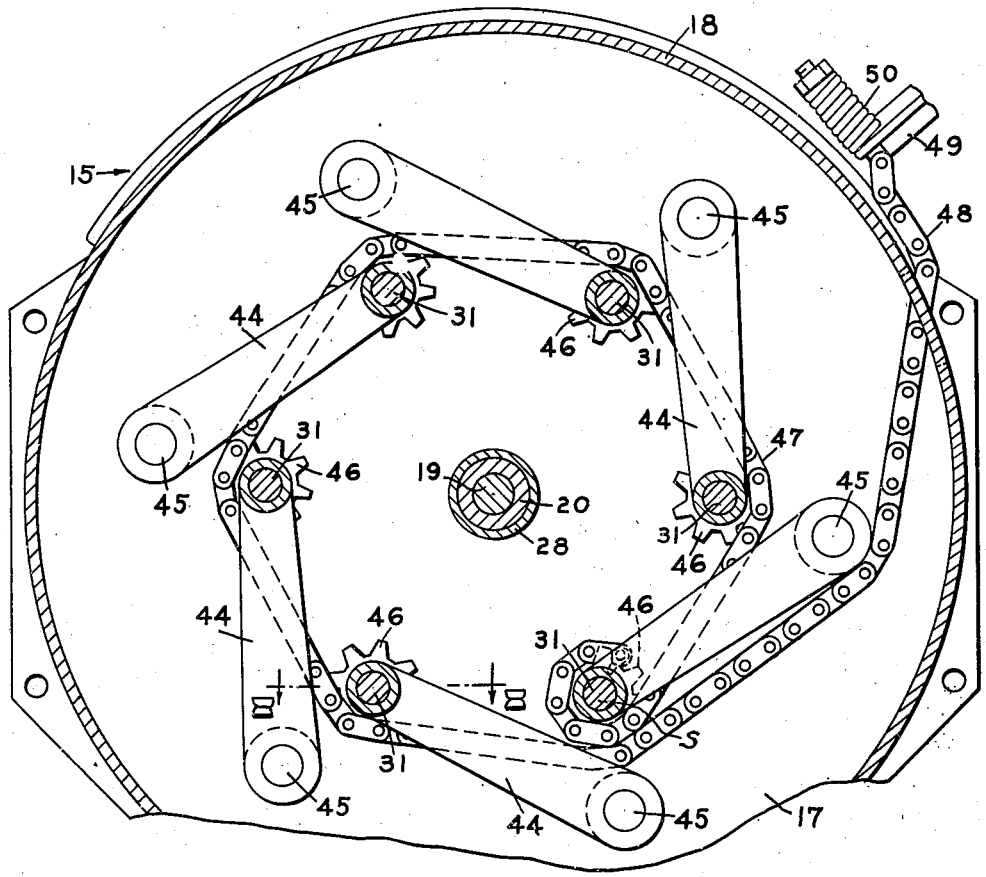
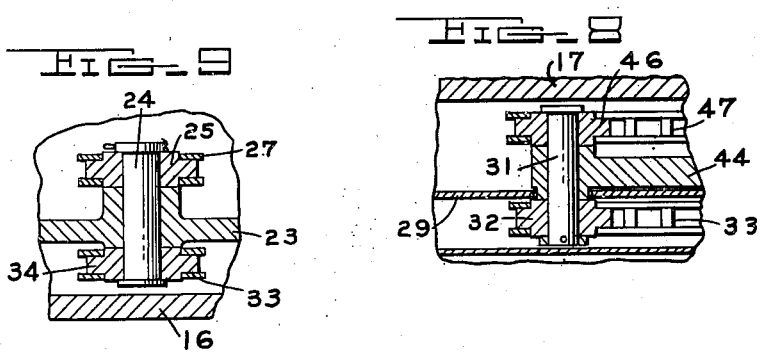
INVENTOR.
ARTHUR RAYMOND CUNNINGHAM
BY
ATTORNEYS

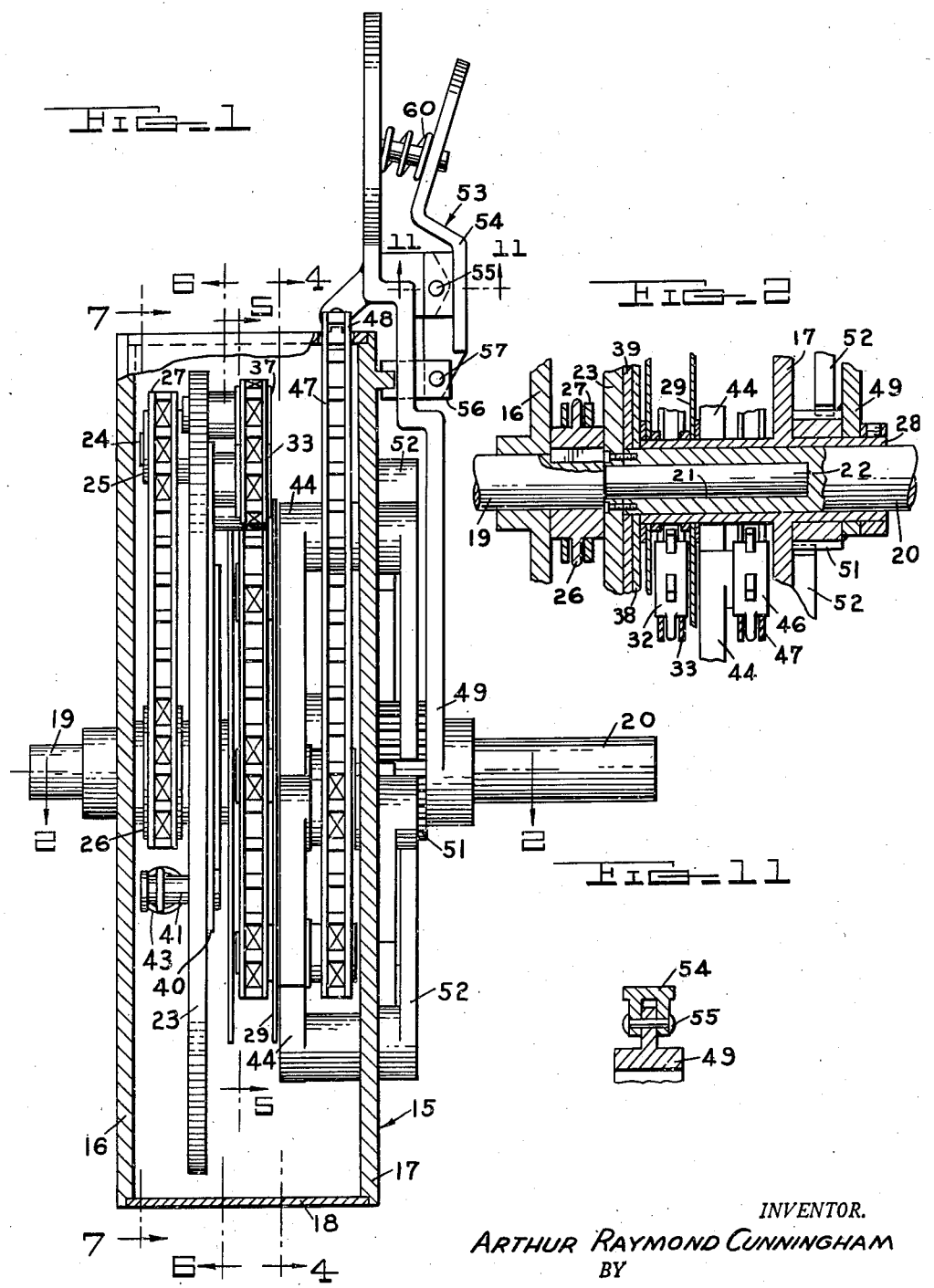

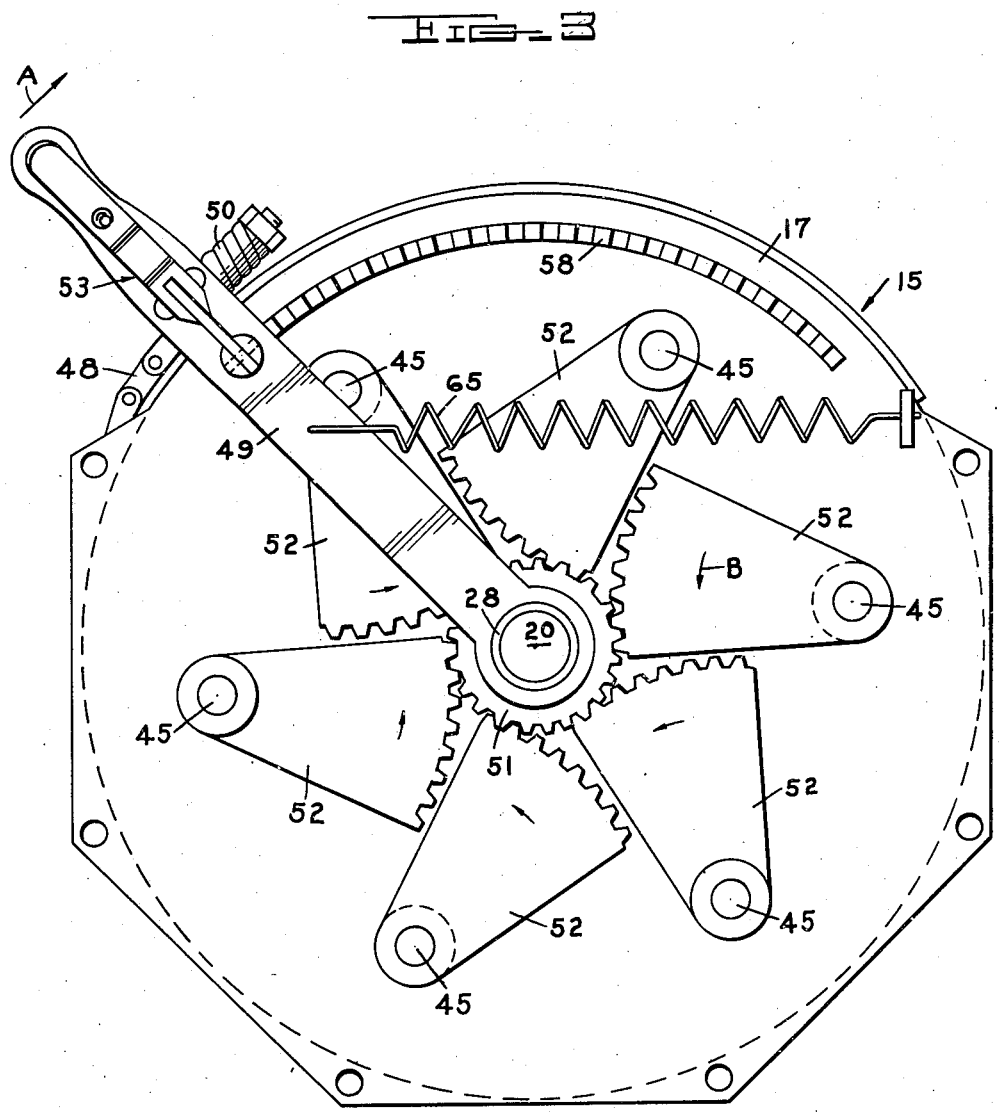

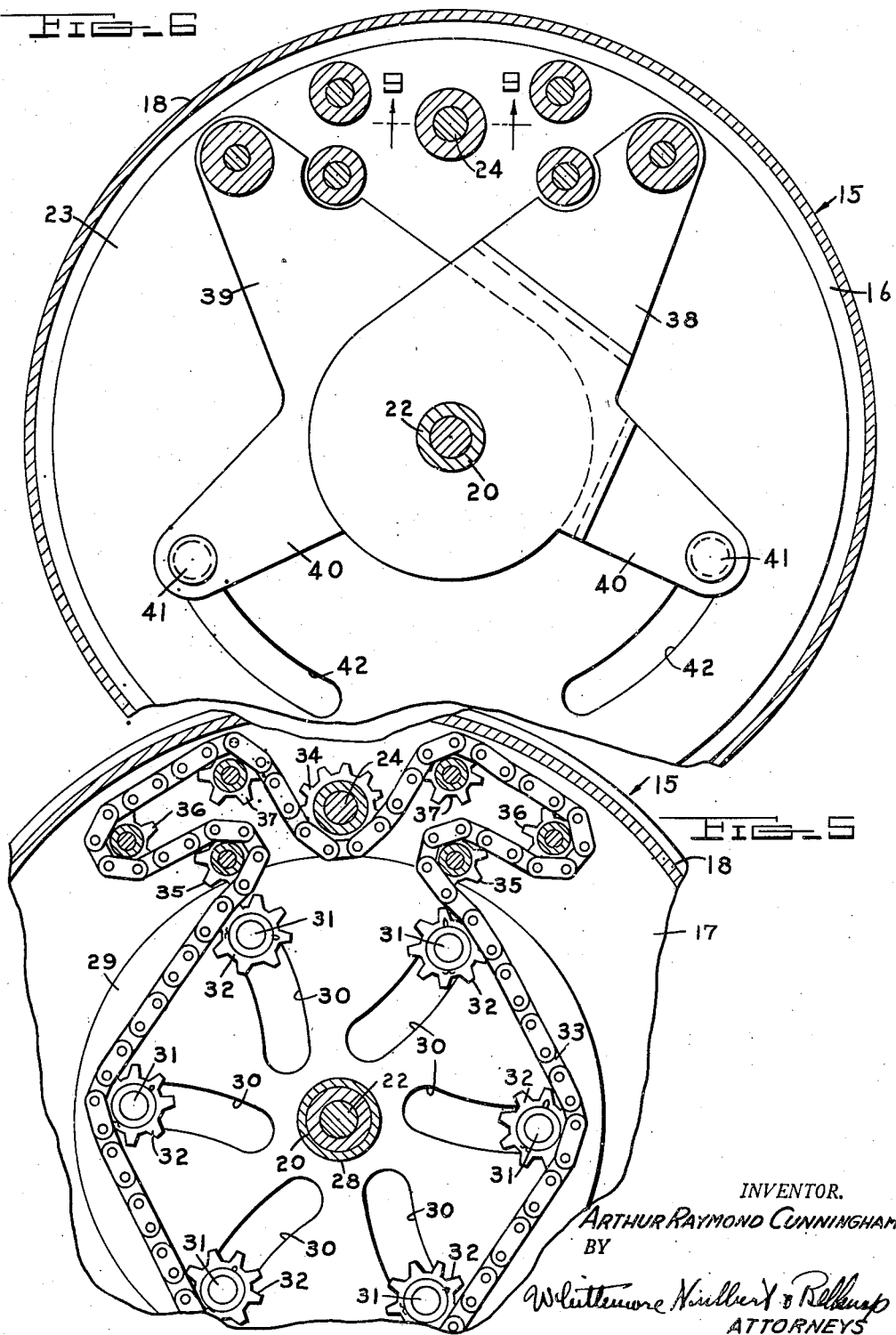

March 15, 1949.　　A. R. CUNNINGHAM　　2,464,635
VARIABLE SPEED POWER TRANSMITTING MECHANISM
Filed April 7, 1947　　5 Sheets-Sheet 5
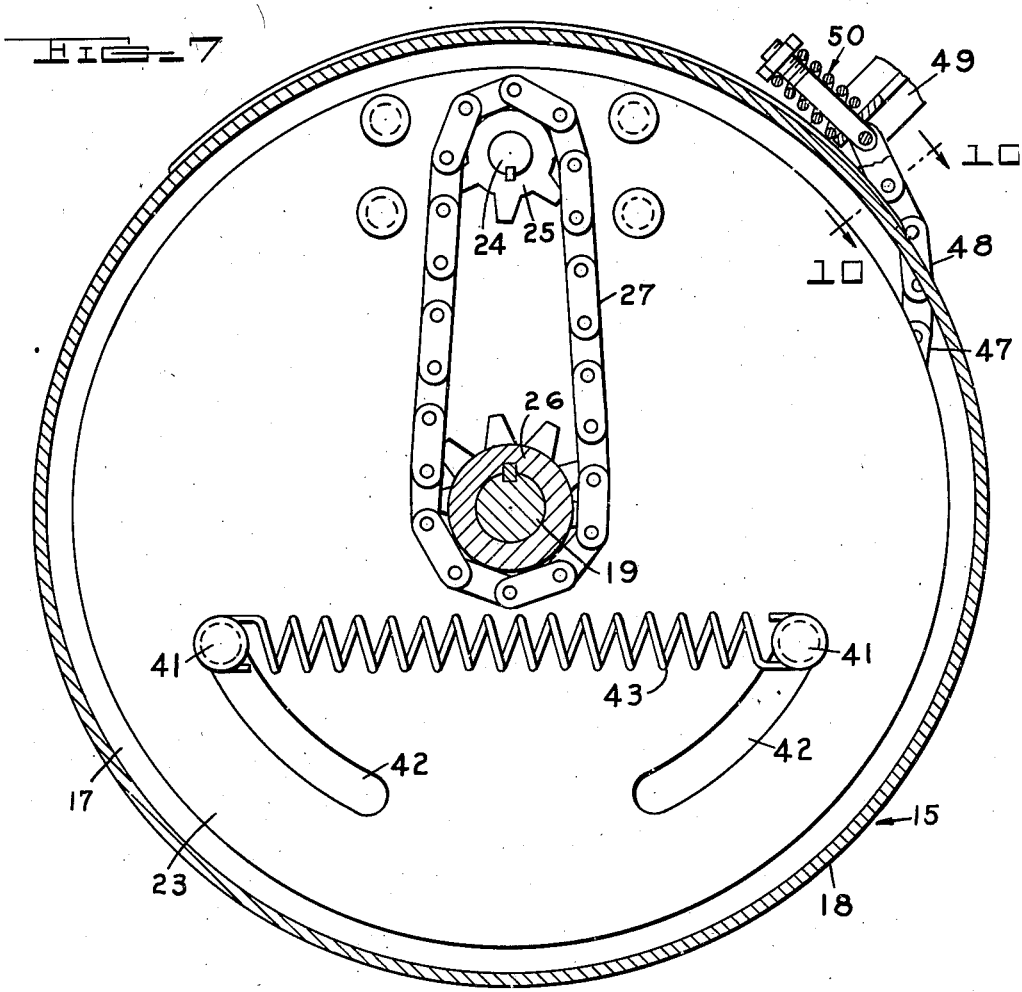
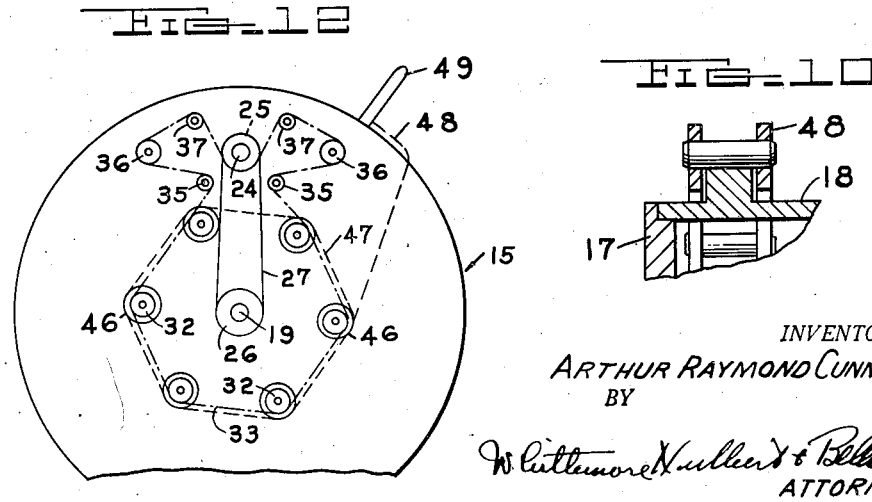
INVENTOR.
ARTHUR RAYMOND CUNNINGHAM
BY
ATTORNEYS Patented Mar. 15, 1949

2,464,635

UNITED STATES PATENT OFFICE 2,464,635

VARIABLE-SPEED POWER TRANSMITTING MECHANISM

Arthur Raymond Cunningham, Detroit, Mich.

Application April 7, 1947, Serial No. 739,907

10 Claims. (Cl. 74—217)

This invention relates generally to power transmitting mechanism and refers more particularly to improvements in variable speed units for connecting a driving element to a driven element.

One of the objects of the present invention is to provide a compact, relatively simple power transmitting unit for positively connecting a drive shaft to a driven shaft and embodying means for manually or automatically varying the ratio between the two shafts.

Another feature of this invention is to provide a power transmitting unit of the above type having mechanism for positively connecting the drive shaft to the driven shaft, and rendering it possible to drive the driven shaft at a multiplicity of different speeds from the drive shaft.

The foregoing as well as other objects will be made more apparent as this description proceeds, especially when considered in connection with the accompanying drawings, wherein:

Figure 1 is a side elevational view partly in section of a power transmitting unit embodying the features of this invention;

Figure 2 is a sectional veiw taken substantially on the line 2—2 of Figure 1;

Figure 3 is an end elevational view of the unit shown in Figure 1;

Figures 4, 5, 6 and 7 are respectively cross sectional views taken on the lines 4—4, 5—5, 6—6 and 7—7 of Figure 1;

Figure 8 is a sectional view taken on the line 8—8 of Figure 4;

Figure 9 is a sectional view taken on the line 9—9 of Figure 6;

Figure 10 is a sectional view taken on the line 10—10 of Figure 7;

Figure 11 is a sectional view taken on the line 11—11 of Figure 1; and

Figure 12 is a diagrammatic view illustrating a part of the driving mechanism.

It will be apparent from the following description that my improved power transmitting unit may be advantageously used in practically all instances where it is necessary or desirable to provide a compact mechanism for positively connecting a driving element to a driven element in a manner to enable obtaining a multiplicity of driving ratios between the elements.

With the above in view reference is now made more in detail to the drawings wherein it will be noted that the numeral 15 indicates a housing having end walls 16 and 17 spaced axially from each other by an annular ring or wall 18. The end walls are removably clamped together with the wall 18 therebetween by any suitably fastener elements not shown herein. A drive shaft 19 extends into the housing through a central opening formed in the end wall 16, and a driven shaft 20 extends into the housing through a central opening in the opposite end wall 17. The two shafts are arranged in axial alignment, and the end of the driven shaft adjacent the drive shaft is formed with a bore 21 for receiving a reduced extension 22 on the drive shaft. Thus the drive shaft is journalled in the driven shaft for rotation relative to the latter.

A disc-shaped member 23 is secured at its center to the driven shaft 20 for rotation with the latter, and a shaft 24 is journalled in the member 23 adjacent the periphery of the same. The shaft 24 extends parallel to the drive shaft 19 and a sprocket 25 is keyed or otherwise secured to the shaft 24 at the outer side of the disc 23. A sprocket 26 is keyed or otherwise fixed to the drive shaft 19 in a common plane with the sprocket 25, and is connected to the latter by a chain 27. Thus the shaft 24 is driven directly from the drive shaft 19.

The driven shaft 20 is journalled in a sleeve 28 extending into the housing through the end wall 17 and suitably secured to the latter. A plate 29 in the form of a disc is centrally apertured to freely receive the sleeve 28, and is positioned at the rear side of the member 23 adjacent the latter. The plate 29 is shown in Figure 5 of the drawings as formed with a plurality of slots 30 extending generally radially outwardly from the axis of the driven shaft 20 and having the outer ends spaced equal distances from each other circumferentially of the plate 29. A shaft 31 extends in an axial direction through each of the slots 30 in a member to enable shifting movement of the shaft 31 in directions toward and away from the axis of the driven shaft 19.

A sprocket 32 is secured to each shaft 31 at the axially outer side of the plate 29, and an endless chain 33 is extended around the sprockets 32 in meshing engagement with the latter. Referring again to Figure 5 of the drawings, it will be noted that the shaft 24 on the rotatable member 23 is located radially outwardly beyond the chain 33 and a sprocket 34 is secured to the shaft 24 in a position to mesh with the chain 33.

It will be noted from the foregoing that rotation of the sprocket 34 applies a driving force on the chain 33. As will be seen from the following description the sprockets 32 are normally fixed against rotation, and since the chain 33 engages only several teeth of each sprocket 32, it follows that the sprocket 34 and its associated idler sprockets move bodily in a circular path around the axis of the driven shaft 20. Inasmuch as the shaft 24 carrying the sprocket 34 is journalled in the plate 23 adjacent the periphery thereof, it also follows that this plate is rotated by the drive shaft 19. It will, of course, be understood that when the sprockets 32 are in their outermost positions, the member 23, and accordingly, the driven shaft 20 is rotated at a relatively low rate of speed. On the other hand, when the sprockets 32 are in their innermost positions relative to the plate 29, the driven shaft 20 or member 23 is rotated at a relatively fast rate of speed. As will be more fully hereinafter described, the sprockets 32 are movable as a unit between the two above extreme positions depending upon the desired rate of speed of the driven shaft 20.

Inasmuch as the effective length or diameter of the chain path 33 is varied upon adjustment of the sprockets 32 relative to the plate 29, it is necessary to provide some means for maintaining the chain 33 taut. In detail it will be noted from Figure 5 of the drawings that the chain 33 is extended around three pairs of idler sprockets designated by the reference numerals 35, 36 and 37. The idler sprockets are freely rotatably supported on the driven member 23 with the sprockets of each pair at opposite sides of the sprocket 34. Actually the sprockets 36 are respectively rotatably supported on the outer ends of a pair of levers 38 and 39 positioned between the driven member 23 and the plate 29. The levers are supported for relative rotation about the axis of the driven shaft 20 and are provided with radially outwardly extending portions 40 having pins 41 at the extremities extending axially through arcuate slots 42 formed in the member 23. A coil spring 43 is positioned with the opposite ends respectively connected to the pins 41. The arrangement is such that the spring 43 tends to move the sprockets 36 apart and thereby yieldably maintains the chain 33 in a taut position around the sprockets 32. The length of the slots 42 is predetermined in relation to the length of the slots 30, so that the chain 33 is maintained in a taut position regardless of the adjustment of the sprockets 32 relative to the plate 29.

The ends of the shafts 31 at the axially inner side of the plate 29 are respectively supported in the free ends of suitable arms 44. All of the shafts 31 are freely rotatably supported on the respective arms 44 with the exception of the shaft S which is secured against rotation on the adjacent arm 44. The free ends of the arms 44 are shown in Figure 4 of the drawings as spaced substantially equal distances from each other around the axis of the driven shaft 20, and the outer ends of the arms 44 are secured to rock shafts 45 extending axially through the end wall 17 of the housing.

A sprocket 46 is secured on the axially inner end of each shaft 31, and one end of a chain 47 is secured to the sprocket 46 on the shafts in the manner clearly indicated in Figure 4 of the drawings. The chain 47 extends around the sprockets 46 in mesh with the latter, and the free end 48 of the chain projects out of the housing through a slot formed in the annular wall 18. The free end 48 of the chain is connected to a control arm 49 adjacent the outer end thereof by a yieldable coupling 50, and the inner end of the control arm is journalled on the driven shaft 20 for rocking movement about the axis of this shaft. Inasmuch as the sprockets 32 and 46 are respectively secured to opposite ends of the shafts 31, and since one end of the chain 47 is secured to the control arm, it follows that this chain normally prevents rotation of the shafts 31 and hence the sprockets 32.

Upon reference to Figure 3 of the drawings, it will be noted that a gear 51 is supported on the driven shaft 20 for rotation about the axis of the latter and is secured to the radially inner end of the control arm 49. The gear 51 meshes with a plurality of gear segments 52 corresponding in number to the number of shafts 45. In the present instance the segments 52 are respectively secured to the shafts 45 and serve to rotate the latter shafts in opposite directions upon rocking movement of the control arm 49 in opposite directions. Upon reference to Figure 3 of the drawings, it will be noted that movement of the control arm in the direction of the arrow A causes the arms 44 and hence the sprockets 46 to swing in a direction toward the axis of the driven shaft 20. Of course, movement of the sprockets 46 from their outermost positions shown in Figure 4 of the drawings toward the driven shaft 20 decreases the effective diameter of the chain path 47, or in other words, increases the length of the chain 47. However, since the free end 48 of the chain is connected to the movable control arm 49, it follows that the effective length of the chain 47 is automatically varied in accordance with the extent of movement of the sprockets 46 and is maintained taut at all times.

Referring now to Figure 1 of the drawings, it will be noted that the outer end of the control arm 49 is provided with a latch 53 comprising a member 54 pivoted intermediate the ends on the control arm by a pin 55 and having a pawl 56 pivoted to the radially inner end by a pin 57. The pawl 56 is adapted to successively engage in an arcuate series of notches 58 formed on the adjacent surface of the end wall 17 of the housing, and the pawl is normally urged into engagement with one of the notches by a spring 60. The spring 60 is located between the radially outer ends of the control arm 49 and the member 54, so as to enable releasing the pawl from the notches 58 by merely pressing the outer end of the member 54 toward the control arm 49 against the action of the spring 60. The distance between adjacent notches 58 corresponds generally to the length of one link in the chain 47, so that advancement of the control arm one notch has the effect of taking one link out of the chain 47.

*Operation*

When the control arm 49 is in the position thereof shown in Figure 3 of the drawings, the effective diameter of the chain path 33 is at its maximum, so that the driven shaft 20 is rotated from the drive shaft at a very low speed. In the event it is desired to increase the speed of rotation of the driven shaft 20, the operator merely manipulates the latch 53 to release the pawl 56 and moves the control arm 49 in the direction of the arrow A in Figure 3 of the drawings. As a result the gear segments 52 are moved by the gear 51 in the direction of the arrow B in Figure 3 of the drawings.

Movement of the gear segments 52 in the direction of the arrow B swings the arms 44 in Figure 4 of the drawings in a direction to move the sprockets 46 inwardly a distance corresponding to the extent of linear movement applied to the chain 47 by the control arm. Inasmuch as the sprockets 32 are mounted on the same shafts 31 as the sprockets 46, it follows that the sprockets 32 are moved inwardly as a unit toward the axis of the driven shaft 20 to reduce the effective diameter of the chain path 33. At this time the sprockets 36 are automatically advanced by the spring 43 to take up the slack in the chain 33.

By reducing the effective diameter of the chain path 33, the speed of rotation of the member 23, and accordingly, of the driven shaft 20 is correspondingly reduced. Thus it will be noted that numerous different speeds may be imparted to the driven shaft 20 by merely altering the effective diameter of the chain path 33. It will also be noted that regardless of the driving ratio between the driving shaft 19 and the driven shaft 20, these two shafts are positively connected together, so that there is no possibility of slippage.

If desired provision may be made for automatically increasing the speed of the driven shaft 20 in accordance with torque requirements by providing a spring 65 shown in Figure 3 of the drawings as having one end fixed to the control arm 49 intermediate the ends and as having the other end anchored on the housing. With this construction, the latch 53 may be eliminated or modified if desired. In any case as the torque requirements are reduced, the arm 49 is advanced by the spring 65 to increase the speed of the driven shaft in the manner described above.

What I claim as my invention is:

1. Variable speed power transmitting mechanism comprising rotatable driving and driven elements, a member rotatable with the driven element, a toothed element rotatably supported on said member and spaced radially outwardly from the axis of rotation of the driven element, a plurality of toothed elements spaced from each other around the axis of the driven element and lying in a common plane with the first named toothed element, an endless chain meshing with the first and second named toothed elements, means supporting the second mentioned toothed elements for movement toward and away from the axis of the driven element, a connection between the driving element and first named toothed element for rotating the latter, and means for selectively moving the second toothed elements as a unit in directions toward and away from the axis of the driven element to vary the effective diameter of the chain path.

2. Variable speed power transmitting mechanism comprising rotatable driving and driven elements, a member rotatable with the driven element, a plurality of sprockets spaced from each other around the axis of the driven element and spaced equal distances radially from the latter axis, a toothed element rotatably supported on said member radially beyond the sprockets and lying in a common plane with the sprockets, an endless chain extending around the sprockets in meshing relation with the latter and also meshing with the toothed element, means supporting the sprockets for movement in directions toward and away from the axis of the driven element, a driving connection between the toothed element and driving element, and means for selectively moving the sprockets as a unit in directions toward and away from the axis of the driven element to vary the effective diameter of the chain path.

3. Variable speed power transmitting mechanism comprising rotatable driving and driven elements, a member rotatable with the driven element, a plurality of sprockets spaced from each other around the axis of the driven element and spaced equal distances radially from the latter axis, a toothed element rotatably supported on said member radially beyond the sprockets and lying in a common plane with the sprockets, an endless chain extending around the sprockets in meshing relation with the latter and also meshing with the toothed element, means supporting the sprockets for movement in directions toward and away from the axis of the driven element, a driving connection between the toothed element and driving element, means for selectively moving the sprockets as a unit in directions toward and away from the axis of the driven element to vary the effective diameter of the chain path, and take-up means for the chain operable automatically to maintain the chain taut regardless of variations in diameter of the chain path.

4. Variable speed power transmitting mechanism comprising rotatable driving and driven elements, a member rotatable with the driven element, a plate fixed against rotation with the member and having the central portion mounted on the driven element, a plurality of sprockets mounted on the plate in spaced relationship around the axis of the driven element and movable toward and away from the latter axis, an endless chain extending around the sprockets in meshing relation therewith, a toothed element rotatably supported on the member radially outwardly beyond the chain and meshing with the latter, a driving connection between the driving element and toothed element for rotating the latter, and means for selectively moving the sprockets in directions toward and away from the axis of the driven element to vary the diameter of the chain path.

5. Variable speed power transmitting mechanism comprising rotatable driving and driven elements, a member rotatable with the driven element, a plate fixed against rotation with the member and having the central portion mounted on the driven element, a plurality of sprockets mounted on the plate in spaced relationship around the axis of the driven element and movable toward and away from the latter axis, an endless chain extending around the sprockets in meshing relation therewith, a toothed element rotatably supported on the member radially outwardly beyond the chain and meshing with the latter, a driving connection between the driving element and toothed element for rotating the latter, means for selectively moving the sprockets relative to the plate in directions toward and away from the axis of the driven element to vary the effective diameter of the chain path, means for maintaining the chain taut regardless of the adjustment of the sprockets, and spring means normally urging the sprockets in directions toward the axis of the driven element.

6. Variable speed power transmitting mechanism comprising rotatable driving and driven elements, a member rotatable with the driven element, a plate fixed against rotation with the member and having the central portion mounted on the driven element, a plurality of shafts spaced from each other around the axis of the driven element and extending axially through slots formed in the plate to permit movement of the shafts in directions toward and away from the axis of the driven element, a pair of sprockets mounted on each shaft at opposite sides of the plate, an endless chain extending around the sprockets at one side of the plate in meshing relation with the latter sprockets, a toothed element supported on the member for rotation and meshing with said chain, a driving connection between the toothed element and the driving element, a second chain having one end fixed to one of the sprockets at the opposite side of the plate and extending around the remaining sprockets at said opposite side of the plate in meshing relation therewith, and a control member connected to the free end of the second chain.

7. Variable speed power transmitting mechanism comprising rotatable driving and driven elements, a member rotatable with the driven element, a plate fixed against rotation with the member and having the central portion mounted on the driven element, a plurality of rock shafts spaced from each other around the axis of the driven element and fixed against rotation with said driven element, a plurality of arms respectively having the outer ends fixed to the rock shafts, a shaft carried by the free end of each arm and extending through slots formed in the plate to permit movement of the second shafts in directions toward and away from the axis of the driven element, sprockets mounted on the second shafts at one side of the plate, an endless chain extending around the sprockets in meshing engagement therewith, a toothed element rotatably supported on the member radially beyond the chain and meshing with the latter, a driving connection between the driving element and toothed element, a second set of sprockets respectively mounted on the second shafts at the opposite side of the plate, a chain fixed to one of the second sprockets and extending around the latter sprockets in meshing engagement therewith, a control arm pivoted for swinging movement about the axis of the driven element and connected to the free end of the second chain, and driving means between the control arm and rock shafts.

8. Variable speed power transmitting mechanism comprising rotatable driving and driven elements, a member rotatable with the driven element, a plate fixed against rotation with the member and having the central portion mounted on the driven element, a plurality of rock shafts spaced from each other around the axis of the driven element and fixed against rotation with said driven element, a plurality of arms respectively having the outer ends fixed to the rock shafts, a shaft carried by the free end of each arm and extending through slots formed in the plate to permit movement of the second shafts in directions toward and away from the axis of the driven element, sprockets mounted on the second shafts at one side of the plate, an endless chain extending around the sprockets in meshing engagement therewith, a toothed element rotatably supported on the member radially beyond the chain and meshing with the latter, a driving connection between the driving element and toothed element, a control arm pivoted for swinging movement about the axis of the driven element, and driving means between the control arm and rock shafts.

9. Variable speed power transmitting mechanism comprising rotatable driving and driven elements, a member rotatable with the driven element, a plurality of sprockets spaced from each other around the axis of the driven element and spaced equal distances radially from the latter axis, an endless chain extending around the sprockets in meshing engagement with the latter, a toothed element rotatably supported on the member radially beyond the chain and meshing with the latter, a driving connection between the toothed element and driving element, means supporting the sprockets for movement in directions toward and away from the axis of the driven element, a pair of sprockets carried by said member within the confines of the chain and meshing with the latter, and spring means normally urging the pair of sprockets in directions to maintain said chain taut.

10. Variable speed power transmitting mechanism comprising rotatable driving and driven elements, a member rotatable with the driven element, a plate fixed against rotation with the member and having the central portion mounted on the driven element, a plurality of rock shafts spaced from each other around the axis of the driven element and fixed against rotation with said driven element, a plurality of arms respectively having the outer ends fixed to the rock shafts, a shaft carried by the free end of each arm and extending through slots formed in the plate to permit movement of the second shafts in directions toward and away from the axis of the driven element, sprockets mounted on the second shafts at one side of the plate, an endless chain extending around the sprockets in meshing engagement therewith, a toothed element rotatably supported on the member radially beyond the chain and meshing with the latter, a driving connection between the driving element and toothed element, a control arm pivoted for swinging movement about the axis of the driven element, driving means between the control arm and rock shafts, means normally urging the arm in a direction to swing the arms inwardly to decrease the effective diameter of the chain path, and means acting on the chain for maintaining the latter taut.

ARTHUR RAYMOND CUNNINGHAM.

No references cited.